United States Patent
Brown et al.

(10) Patent No.: US 6,865,427 B2
(45) Date of Patent: Mar. 8, 2005

(54) METHOD FOR MANAGEMENT OF WORKFLOWS BETWEEN DEVICES IN A PERVASIVE EMBEDDED OR EXTERNAL ENVIRONMENT

(75) Inventors: William A. Brown, Raleigh, NC (US); Richard William Muirhead, Tyler, TX (US); Francis Xavier Reddington, Sarasota, FL (US)

(73) Assignee: International Business Machines Corporation, Armonk, NY (US)

(*) Notice: Subject to any disclaimer, the term of this patent is extended or adjusted under 35 U.S.C. 154(b) by 299 days.

(21) Appl. No.: 10/199,247

(22) Filed: Jul. 18, 2002

(65) Prior Publication Data

US 2004/0015242 A1 Jan. 22, 2004

(51) Int. Cl.[7] .............................................. G05B 19/04
(52) U.S. Cl. ............................ 700/19; 700/12; 700/23; 709/223; 709/224; 725/79; 340/3.1
(58) Field of Search ............................. 700/12, 13, 19, 700/23, 27, 65, 47–49; 709/223, 224; 725/78, 79; 340/310.1, 3.1, 3.3, 3.32, 825.69, 825.72, 825.52

(56) References Cited

U.S. PATENT DOCUMENTS

| | | | | |
|---|---|---|---|---|
| 5,086,385 A | * | 2/1992 | Launey et al. ................ 700/83 |
| 5,537,104 A | * | 7/1996 | Van Dort et al. ........ 340/825.52 |
| 5,801,940 A | * | 9/1998 | Russ et al. ...................... 700/9 |
| 5,815,086 A | * | 9/1998 | Ivie et al. .............. 340/825.52 |
| 5,924,486 A | * | 7/1999 | Ehlers et al. ................ 165/238 |
| 6,052,750 A | * | 4/2000 | Lea .............................. 710/72 |
| 6,112,127 A | * | 8/2000 | Bennett ....................... 700/86 |
| 6,192,282 B1 | * | 2/2001 | Smith et al. .................. 700/19 |
| 6,243,707 B1 | * | 6/2001 | Humpleman et al. ....... 707/102 |
| 6,385,495 B1 | * | 5/2002 | Bennett ....................... 700/86 |
| 6,546,419 B1 | * | 4/2003 | Humpleman et al. ....... 709/223 |

* cited by examiner

*Primary Examiner*—Emanuel Todd Voeltz
(74) *Attorney, Agent, or Firm*—David Mims; Darcell Walker (57) ABSTRACT

The present invention provides a method and system to monitor the statuses of devices that can operate and transmit current device status information to a storage location. The present invention also provides a method to manage and initiate sets of instructions that will be performed by devices in response to a set of current statuses of one or more devices. Each set of instructions is known as a "workflow routine". Each workflow routine will be based on a set device statuses. This set of device statuses can be referred as a device scenario. When a status of a device changes, the workflow manager of the present invention will check the statuses of the devices in the scenario to determine if the scenario conditions for the initiation of a specified workflow have been met. When the conditions have been met, the workflow routine will be initiated and perform a set of instructions which could lead to the performance of some activity by one or more devices in the network.

27 Claims, 10 Drawing Sheets

| 1 | On | 4:22pm | 75°F |
|---|---|---|---|
| 2 | Off | 3:58pm | 72°F |
| 3 | Off | 3:38pm | 77°F |
| 4 | Off | 3:25pm | 77°F |
| 5 | On | 3:18pm | 78°F |
| 6 | Off | 2:30pm | 73°F |
| 7 | On | 2:17pm | 77°F |
| 8 | Off | 1:30pm | 72°F |
| 9 | On | 1:10pm | 76°F |
| 10 | Off | 12:30pm | 73°F |

FIG. 7

| 1 | 10 amps | 5 amps |
|---|---|---|
| 2 | 13 amps | 2 amps |
| 2 | 15 amps | 0 amps |
| 2 | 8 amps | 7 amps |
| 1 | 5 amps | 10 amps |
| 0 | 0 amps | 15 amps |
| 1 | 3 amps | 12 amps |
| 1 | 10 amps | 5 amps |
| 0 | 0 amps | 15 amps |
| 1 | 5 amps | 10 amps |

METHOD FOR MANAGEMENT OF WORKFLOWS BETWEEN DEVICES IN A PERVASIVE EMBEDDED OR EXTERNAL ENVIRONMENT

FIELD OF THE INVENTION

This invention relates to a method for automatically operating devices connected to a network and in particular to a method for capturing the operating status history of the devices and using the operating status data of one or more devices to manage the implementation of sets of operating instructions that control the operation of one or more devices connected in the existing network environment.

BACKGROUND OF THE INVENTION

Automation systems are used to control the behavior of an environment such as an industrial plant, an office building or a residential dwelling. Currently there is an increasing trend to automate various activities and task in our society. Industries such as the banking industry, the automotive industry, the oil and refining industry and transportation industry use computers and automation to control machines and other various devices during the performance of many tasks and processes. The application of automation control systems has expanded from large industries to small businesses and residential homes.

Home automation systems, or home management systems as they are sometimes called, commonly provide for control of lighting, heating and air conditioning, window shades or curtains, pool heaters and filtration systems, lawn sprinklers, ornamental fountains, audio/visual equipment, and other appliances. Home automation systems are frequently integrated with a home security system so that when a fire alarm is raised, for example, internal and external lights will be turned on. Security systems frequently include lighting control and other types of home automation as an option. Many larger homes incorporate a home theater that requires a certain amount of automation for convenient operation and this automation is often extended to other parts of the dwelling. In farms, the automation system will also control outbuilding heating and lighting and warn of abnormal conditions in automated feeding machinery and other equipment.

One form of automation system includes a central control unit that monitors environmental sensors and inputs from user controls and maintains a schedule of preprogrammed time-of-day and day-of-the week events. Inputs to the central control are provided by dedicated low-voltage wiring, for example, from door and window sensors, signals carried on power lines, RF signals, signals on existing telephone wiring and, occasionally, optical signals. The central control unit is controlled by a program that is either specifically built for the particular installation or a general-purpose program with a user interface that allows the owner or a technician employed by the owner to make certain types of modifications. The interfaces to these programs can be anything from strings of digits entered on standard touch-tone keypads, for example, Home Automation Inc.'s Omni Automation and Security System, to graphical user interfaces, for example, the Molex "Choices" software.

The communication between the central control unit and various devices can be through a variety of protocols. The Echelon Corporation has built home automation and industrial control apparatus based on a signaling protocol they refer to as LonWorks that uses a network of nodes each of which has one or more microprocessors. The system is designed to operate in a "cooperative computing" environment in which the individual nodes maintain their own programs. Programming of the individual nodes can be done by downloading new software from a temporarily attached lap top computer or by downloading software over the LonWorks network. A similar approach has been taken by CEBus and has been used in many custom installations for larger homes and office buildings. While such systems eliminate the central control unit, modifying the software still requires the use of a PC-based system and usually requires the user to acquire relatively expensive hardware and software and become proficient in the use of PC-based software.

The latest internationally accepted standard for residential communication is the Consumer Electronics Bus (CEBus). The Media used in a CEBus Network topology can vary between power-line wiring (PL), telephone wiring (TP twisted-pair), coaxial cable (CX), RF (radio frequency) and the like. It provides the standard for creating products and devices to communicate with each other, and should build intelligence into homes or any physical or virtual facility with smart products (aggregation of smart devices) in anticipating tomorrow's consumer needs. Though the intent of the original specification was directed at the residential market, the inventions disclosed here by its three inventors have envisioned a much more extensive application uses. The consumer can be any person, a firm, government agency, whatever or whomever has a need to communicate to smart devices.

The official name for CEBus standard is ANSI/EIA 600. At the core of the standard are the CAL (Common Application Language) and the Application Layer. It provides the basis of the interoperability between CEBus compliant devices and a transport independent version (Generic CAL) (Generic CAL) ANSI/739 that an integral part of the Home PnP (Plug and Play) ANSI/721 specification (which defines how networked products of various manufactures achieve interoperability regardless of the communication protocol used (CEBus, X-10, RS-232, IEEE-1934, TCP/IP etc.)

The devices that utilize these standards contain context data structures. Each CAL Context is a predefined data structure built from reusable objects, and represents a common consumer product function such as a tuner, time or temperature sensor. These context data structures are defined in a set of subsystems definitions that represent industry standard guidelines that define the behavior of the device, which is necessary to enable products to correctly use the subsystem models.

In a home, there are many appliances/devices that are powered by electricity, either AC or DC. At the present time, these devices do not have the ability to communicate with each other. In addition, there is no standard method to keep track of the current state of each device. The state attributes could be for example 'on', 'off', 'channel', 'temperature' etc. Currently some devices have a means to report information back to the manufacturer of the device activities of the device through proprietary channels, however there is no way currently for the various devices to communicate with each and no way for the homeowner to receive this type of status information. In addition, a homeowner or facility owner does not have a way to control these devices or who has access to these devices.

Electronic devices traditionally have two states either on or off. Today, with the use of Context data structures embedded within a device, non-persistent property characteristics are stored within the device. This property data is overwritten as changes to the device occur. Storage of this information outside this limited capacity of the device is necessary for any applied application.

It is desirable to provide an automation system that has a central control unit that can enable various devices on the same system to communicate with each other. In addition it is desirable to have a standard method to keep track of the current and past states of each device on the system. It is another desire to have a system when the homeowner or facility owner can have access to and control these devices. It is also desirable to provide a method that can implement instructions to automatically operate one or more devices on the network based on a set of operating statuses of devices on that network. Lastly, it is desirable to provide a method to manage the implementation of sets of instructions that operate one or more devices on the network based on a set of operating statuses of devices on that network.

SUMMARY OF THE INVENTION

It is an objective of the present invention to provide a method and system monitor the status of devices that operate in an environment such as a physical facility.

It is a second objective of the present invention to create and maintain a history of the activity of a device through the recording of the status history of the device.

It is a third objective of the present invention to provide a set of instructions to enable one or more devices on the network to perform operations in accordance with the set of instructions.

It is a fourth objective of the present invention to provide a set of instructions to enable one or more devices on the network to perform operations based on the current status of one or more devices.

It is a fifth objective of the present invention to determine a set of conditions under which the set of instructions will be initiated to enable one or more devices on the network to perform operations based on the current status of one or more devices.

It is a sixth objective of the present invention to provide a method to monitor and manage the initiation of the sets of instructions that are performed by devices based on device status information.

In this invention, each device in the network is in communication with a state manager process. Associated this state manager can be a storage location that will store the identity of each device and the current and past statuses of the device. The storage location can also be a remote location. The status is any current state of a device can have one general attribute or multiple attributes. An example of a device is a videocassette recorder. The status could be one attribute such as "off" and "on" or multiple attributes such as off, on, start, stop, rewind, record, pause, program or channel. For a multiple attribute device, a change in any attribute would constitute a change in the device status. When this change occurred, the device would transmit the change to the state manager. This change in status would be stored as the current status of the device. For each device, the storage location would contain a current status and a set of past statuses such the owner of the facility or any authorized user could view the activity history of a device.

The present invention provides a method to manage and initiate sets of instructions that will be performed by devices in response to a set of current statuses of one or more devices. Each set of instructions is known as a "workflow routine". Each workflow routine will be based on a set device statuses. This set of device statuses can be referred as a device scenario. When a status of a device changes, the workflow manager of the present invention will check the statuses of the devices in the scenario to determine if the scenario conditions for the initiation of a specified workflow have been met. When the conditions have been met, the workflow routine will be initiated and perform a set of instructions which could lead to the performance of some activity by one or more devices in the network.

DETAILED DESCRIPTION OF THE INVENTION

The present invention is a method to create a set of instructions or routines that can automatically control the operation of one or more devices in the system, when a defined set of conditions occur on that system. A set of routines will be referred to as a Workflow. The set of conditions, under which a Workflow will be initiated, is based on status information of one or more devices on the system. This device status information is created by a method that collects a unique set of data containing the operations of a device over a period of time.

In order to clearly illustrate the techniques in this invention, the description of this invention will be in the context of an application in a physical facility. However, the application of this invention encompasses applications in addition to the physical facility environment described herein such as a virtual facility. In this example, the present invention provides a method and system to monitor and manage the statuses of devices that operate in a physical facility from a central location. The physical or virtual facility can vary and can be for example a business, a factory, a computing center, a distributed network of devices, or satellites orbiting in space. The implementation of the present invention does not need to be configured as a centralized control contained within a building structure. For example, the facility can be a home is using the latest internationally accepted standard for residential communication (which in this example is the Consumer Electronics Bus (CEBus)), In this home the State Management repository will hold persistent all state information of all compliant devices. In an illustration, for a radio device, the repository will capture data that comprise the present and past state of the radio, how long it has been on, its tuned broadcasting frequency, its volume level, the time it was tuned to that particular station, the station it was tuned to previously, and the time it was tuned to that previous station. For a different device, the system will also capture the status of the smoke detectors in the house, whether they are operable, if they need maintenance, when each detector was last activated, and the amount of time they were active. The State Management repository of the present invention can also capture anyone or any device trying to gain electronic access to devices in this facility, the time of the attempted access, the purpose of this access, and the origin of this access attempt This data can remain in the persistent store for the life of the device, the life of the home, or a predetermined time period established by the owner.

The communication with all compliant devices in this CEBus Network topology can use any or all of the following mediums; power-line wiring (PL), telephone wiring (TP twisted-pair), coaxial cable (CX), RF (radio frequency) and other similar transmission mediums. The present invention provides the standard for creating products and devices to communicate with each other, and build intelligence into homes or any physical or virtual facility with smart products (aggregation of smart devices) in anticipating the needs of tomorrow's consumer. The present invention has applications in various segments of society, which include individual consumers, a business, a firm, or governmental agency.

Figure 1:
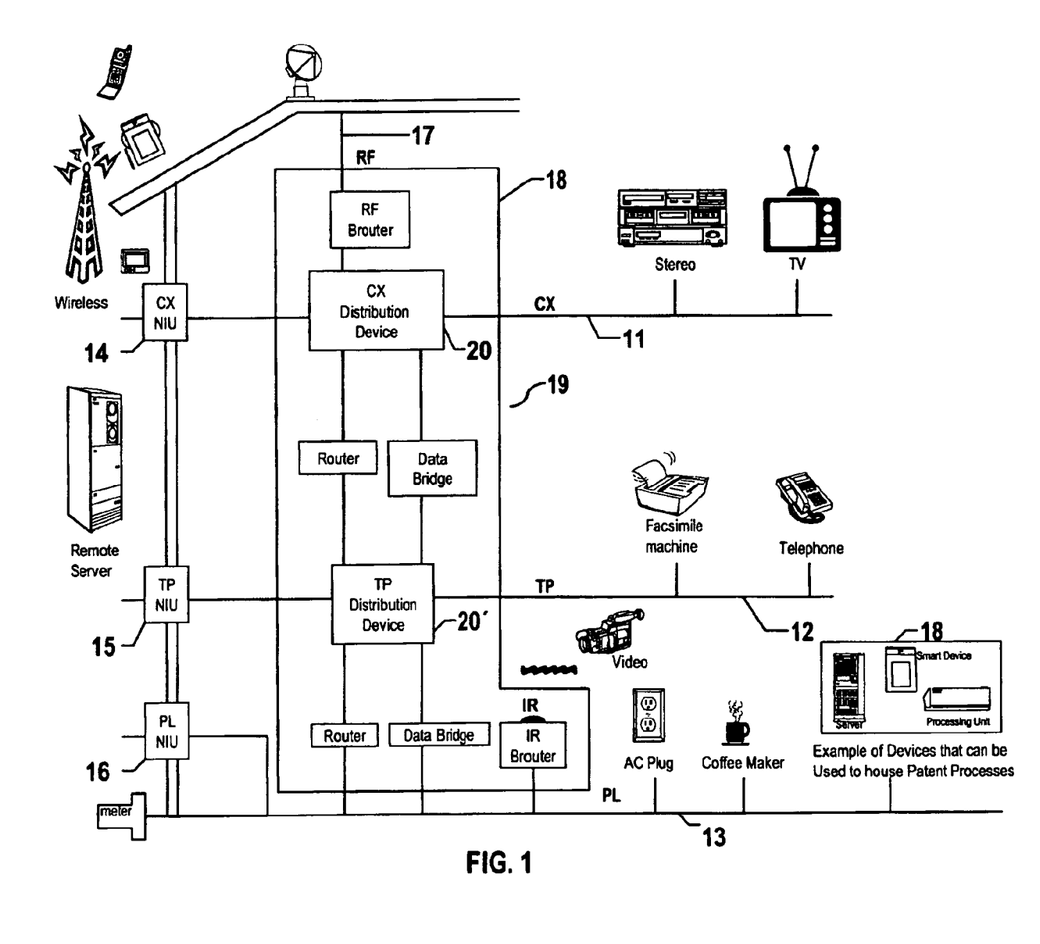
FIG. 1 is an illustration of a configuration of components in a physical facility that implements the method and system of the present invention.

FIG. 1 is a configuration of components in a system that will incorporate the Workflow routines of the present invention. In this configuration lines 11, 12 and 13 are various ways that information and energy can enter a facility to enable operations of the devices in the facility. Line 11 represents communications over a coaxial cable through a device such as a television set. Line 12 represents communications over twisted pair cables through a device such as a telephone. Line 13 represents the supply of energy through a standard power line wired into the facility to operate devices and appliances in the facility such as a coffee maker. These communication lines are physical and therefore have a physical entry into the facility. The physical entry points for the coaxial cable, twisted pair and power lines are represented by NIU boxes 14, 15, and 16 respectively. Also shown is an input medium using radio frequencies (RF) 17. Devices that communicate through this medium are remote devices/wireless devices that include devices such as cellular telephones. In the present invention, there would be a status of each device in facility regardless of the manner in which the device is powered or the manner in which the device communicates. The state manager 18 is a process that captures status information for the various devices and coordinates communications between the various devices in the facility. In addition, this state manager 18, using industry standard format, provides persistence to a data store and can transmits data to any device in the facility. Section 18 illustrates a cluster of bridges and routes that provide communication links between the incoming information lines (11, 12, and 13), the distribution devices 20 and 20' and the devices.

The state manager 18 receives the information from the various types of devices. This control section stores the status information for the various devices and coordinates communications between the various devices in the facility. In addition, this control provides for a standard format to store and transmit data from any device in the facility. The control section comprises routers that direct the various types of information from the different devices. The bridges provide communication links between the incoming information lines (11, 12, and 13), the distribution devices 19 and 20 and the devices. Further descriptions of the system can be found in a co-pending U.S. patent application Ser. No. AUS920020055US1 to the same inventors. The contents of which are incorporated herein by reference.

As previously mentioned, the devices that utilize the CEBus standards contain context data structures. Each CAL Context is a predefined data structure built from reusable objects, and represents a common consumer product function such as a tuner, time or temperature sensor. These context data structures are defined in set of subsystems definitions that represent industry standard guidelines that define the behavior of the device. These guidelines are necessary to enable products to correctly use the subsystem models.

Figure 2:
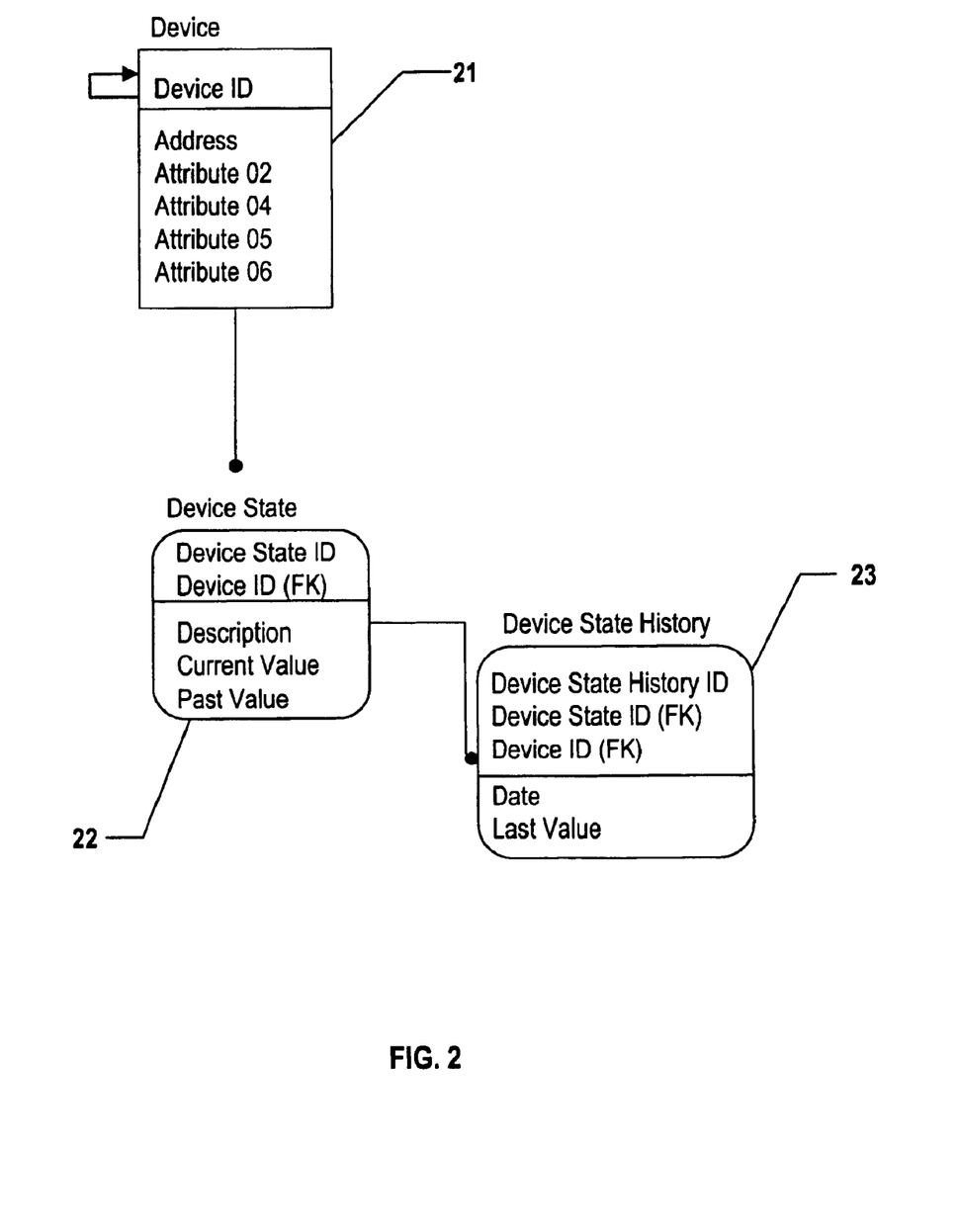
FIG. 2 illustrates a state diagram showing the state management of a CAL message compliant device.
Figure 3:
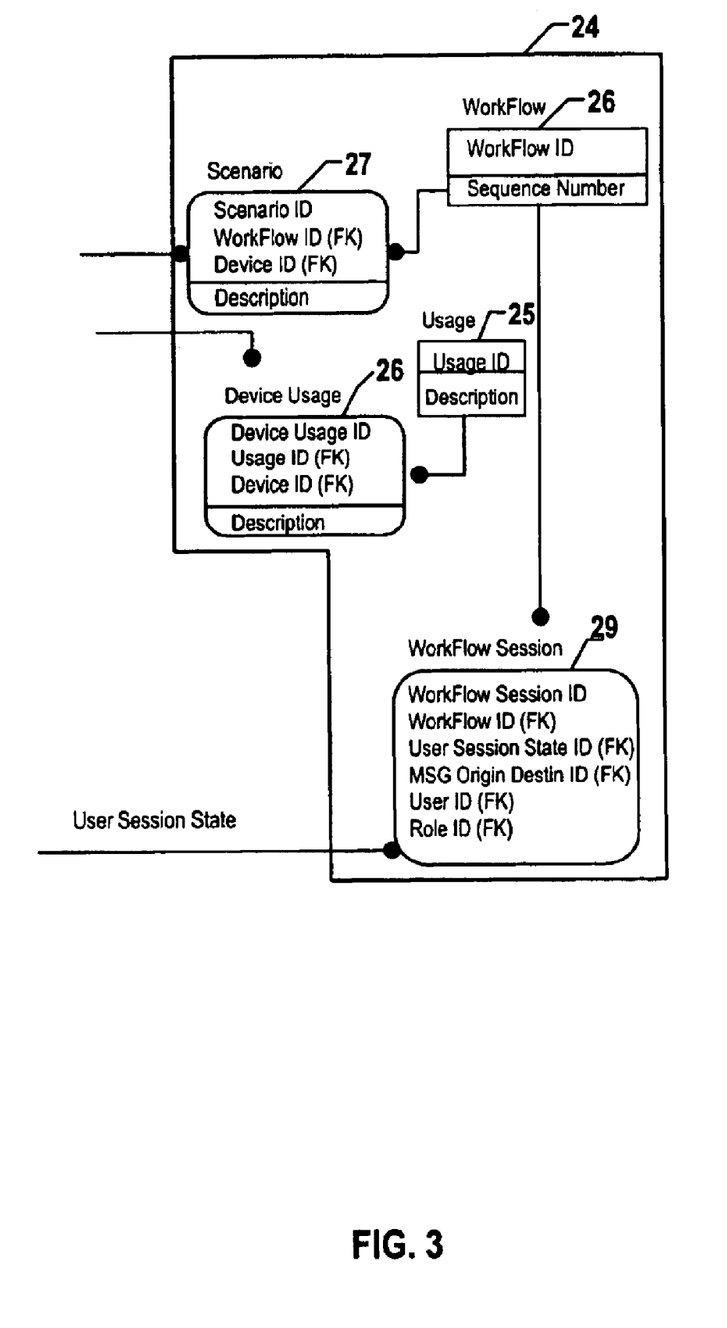
FIG. 3 is an illustration of a data model configuration of the present invention.

FIG. 2 illustrates a process and data flow model of a device state management system of the present invention. It maintains state (status) information of all devices, sensor and components that can be communicated with on the system. This model provides the basis and core of sub systems status (state), transition and event driven based decision-making operation. It maintains current status of devices and it's past state history. It also offers the capacity to reset status in the event of an interruption in power or reversing an updating entry. The names chosen in this model exemplify distinctly what the process flow represents. Regardless, if the entities and its attributes are renamed or represented in a de-normalized fashion. The effect of the model is the same. The device 21 comprises attributes that define it current data values, and primary event driven operations. Devices can also be an aggregation of smaller devices (i.e. sensors, components, etc.) The device has a Unique Identifier and sensor(s) or component(s) that are aggregated make up that device [i.e. a thermal sensor, and a Thermostat (consists of thermal sensor, LED display etc.) are both considered devices. Though one attribute may be part of the composition of another.] The device state 22 represents current status configuration of the device. This device state comprises: 1) Device State ID—Unique identifier of the specific status state it references, 2) Description—Clear Definition of the State that is identified by the Device State ID, 3) Current Value—Current Status value of the device and 4) Past Value_—Previous Status value of the device. The Device State History 23 contains the history of pass values per device which include: 1) Date— Date of historical record and 2) Last Value—last value recorded on that date FIG. 3 is an illustration of a configuration for a workflow creation and management 24 model. This model identifies the components that comprise the workflow management data model. The Workflow manager controls the implementation of routines called workflows. A further description of workflows is found in a copending U.S. patent application Ser. No. AUS920020209US1 to the same inventors. The contents of which are incorporated herein be reference. The workflow management component 24 manages the set of scenarios, which represent the collective usage pattern of one or more devices by a user (refer to user definition under security). The components of workflow management are usage 25, device usage 26, scenario 27, workflow 28 and workflow session 29. The usage attribute 26 is a default generic intent of a sensor, component or device. The usage ID defined the usage record. The description is the usage definition (i.e. temperature sensor). The Device Usage attribute 26 is the actual usage of device. The device usage ID uniquely defines the device usage record. The description defines the actual device usage in words such as fire detector. The Scenario 27 is a user-defined action. It is a triggered event that causes communication between two or more devices. The Scenario ID defines the scenario record. The Workflow 28 is a user-defined sequence of scenarios. A specified activity can cause multiple scenarios to be invoked, i.e. a home alarm system when activated can trigger a workflow routine that causes lights to come on. The Workflow ID defines the workflow record. The Sequence Number identifies what sequence this workflow is executed, when there is more than one workflow defined. The description accurately defines the workflow intent. The Workflow Session 29 manages the existence of an executing workflow (s). The Workflow Session ID defines the record, which represent the life of an executing workflow. When interrogated, the workflow session describes which if any workflows are currently in process against a given user session.

Figure 4:
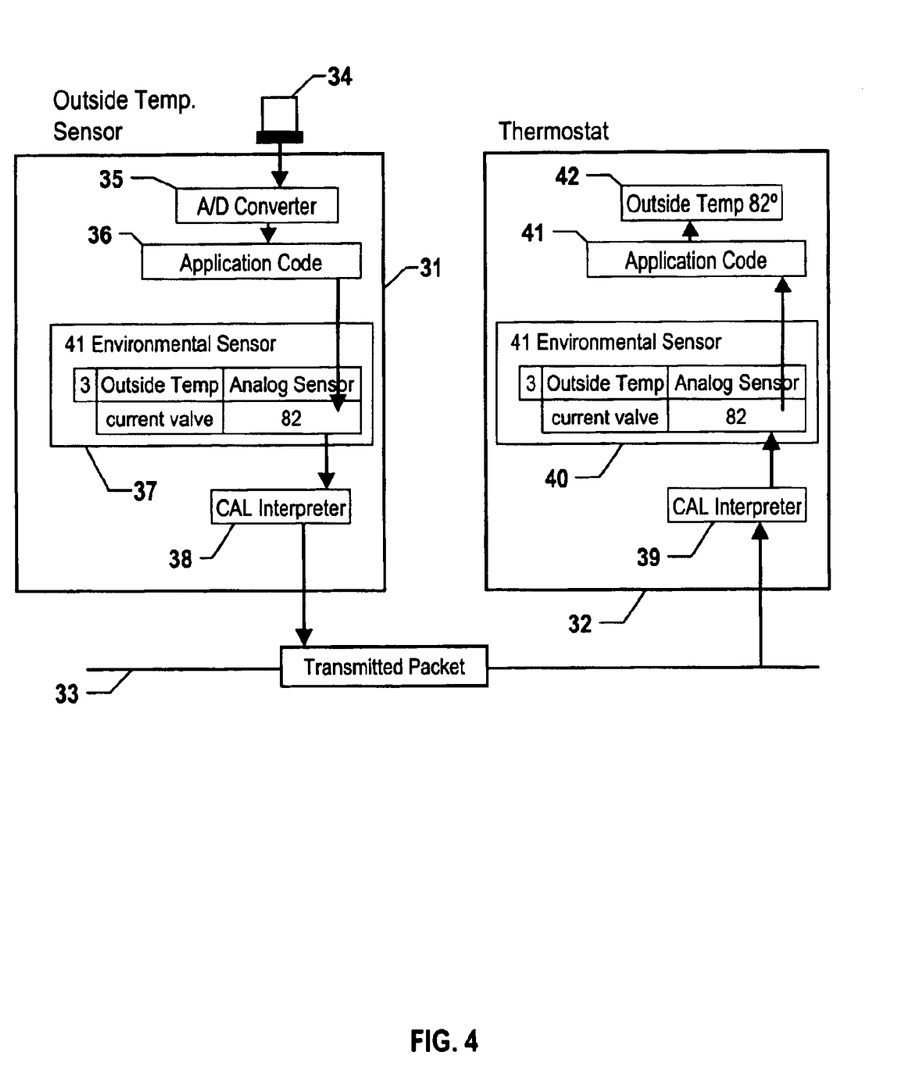
FIG. 4 represents an example of the application of the present invention to a thermostat system.

The creation and implementation of the methods for Workflows, in the present invention, can be illustrated through applications to the thermostat and cooling system shown in FIG. 4. This thermostat and cooling system comprises two different devices on a system that communicate with each other using this CEBus network topology standard. One device is an outside temperature sensor 31, the other being a thermostat 32. Both devices store within their solid-state memory context data structures, in which contain different attributes and their values. The sensor and thermostat can communicate with the central control section over a transmission bus 33. The outside temperature system comprises an actual sensor 34 that detects the current outside temperature. This sensor sends an analog signal of the measured to temperature to an A/D converter 35 that converts the signal to digital form. The application code box 36 processes this signal and sends it to a display 37. This application code box 36 contains standard software that can exist on any device. The use of a Consumer Electronic Bus (CEBus) protocol allows for application software to reside on each device. Box 37 displays the current temperature measured by the sensor 34. The Common Application Language (CAL) interpreter 38 receives this measurement and transmits the information via the transmission bus 33 to the state manager 18. The CAL interpreter parses and understands the message format and the transmitted packet represents a communication link between the two devices. This information would be recorded for the temperature sensor in a storage section each time the temperature sensor detected a change in temperature. The internal thermostat 32 contains a Common Application Language (CAL) interpreter 39 to facilitate communication via the transmission bus 33 with the central control section. Also contained in the thermostat is a temperature display 40 similar to the display 37 in the outside temperature sensor 31. Application code 41 puts the temperature information in a form for the temperature display 42. In accordance with the present invention, upon receiving the change in temperature notification from the temperature sensor, the central control section can send a temperature change notification to the thermostat of the new sensed temperature. The thermostat can then adjust the room or facility based on the new sensed temperature. This thermostat changed will then be broadcast/sent to the central control section and recorded as a change in status of the thermostat.

Figure 5:
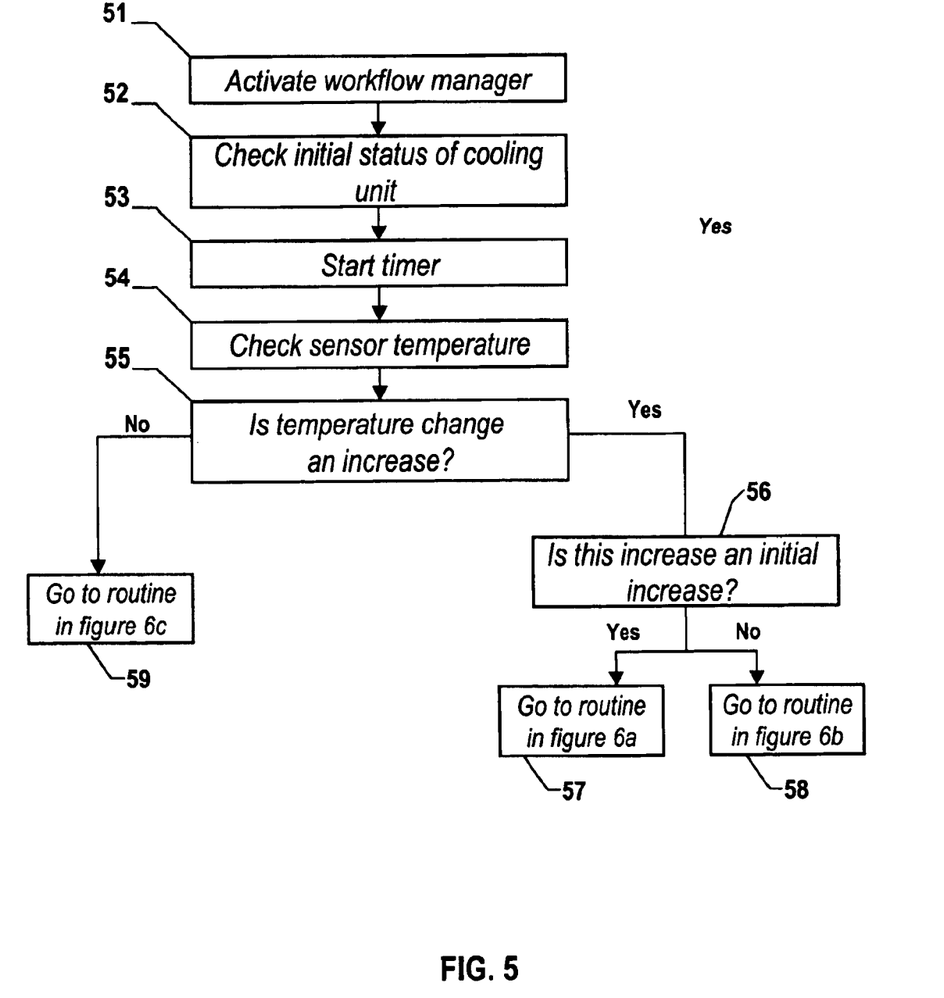
FIG. 5 is a flow diagram of a workflow manager that can manage the implementation of the workflow routines in FIGS. 6a, 6b, 6c, 6d and 6e.

FIG. 5 shows a workflow manager process that manages the implementation of a set of workflow routines designed to cover a scenario where the user wants to limit the amount of time the cooling unit continuously operates to 20-minute intervals. Prior to the implementation of this routine, the threshold temperature and the maximum operating time interval will be determined and entered into the workflow. When there is a change in the status of the temperature sensor, the workflow manager will determine which workflow routine to activate based on the particular status change and the existing conditions at the time of the status change. In this system, there will be a change in the status of the temperature sensor each time the sensor detects a change in the temperature.

Referring to FIG. 5, the workflow manager is in a constant monitoring state 51. The condition for control of the operating intervals of the thermostat system will have an initiating condition that will trigger this set of workflow routines that will control the thermostat system. The initiating condition, in this example, is a time of day, for instance 8:00 am. This initiating condition will also cause the workflow manager to begin monitoring this set of workflow routines. The workflow manager check the initial status of the cooling system in step 52 to determine whether the system is off or on at 8:00 am. The workflow manager will also check the actual temperature reading of the temperature sensor. The workflow manager will then set a timer in step 53. This timer will run until there is a change in the operating status of the cooling system from on to off or from off to on. At that point, the timer will restart. The workflow manager is now in a monitor state. At the next change in temperature, the workflow manager will check the temperature sensor, step 54, to get the new temperature reading. The workflow manager can get this information from the storage location for the temperature sensor device or the thermostat device. After getting this information, in step 55 the workflow manager will determine whether the change is a temperature increase or decrease from the previous temperature reading. If the determination is that the new temperature reading is an increase from the previous temperature, then the workflow moves to step 56, where there is a determination whether this present temperature change is the first change since the initiation of the workflow monitor. The workflow manager also checks the status of the cooling unit. If this temperature reading is the first change since initiating the workflow manager, and the reading was a temperature increase and the cooling unit was in an initial status of off, then the workflow manager will activate the workflow illustrated in FIG. 6a in step 57.

Figure 6A:
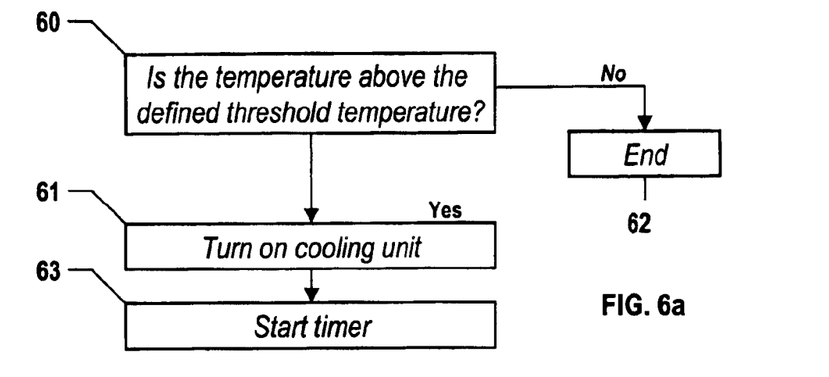
FIGS. 6a, 6b, 6c, 6d and 6e are examples of various workflow instruction sets for the thermostat shown in FIG. 4.

Referring to FIG. 6a, step 60 determines if the measured temperature is above the defined threshold temperature. If the temperature is not above the threshold, then the workflow routine in FIG. 6a ends, step 62, because there will be not change to operation of the cooling unit. If the determination in step 60 is that the new temperature is above the threshold, then step 61 turns on the cooling unit. Step 63 restarts the timer.

Figure 6B:
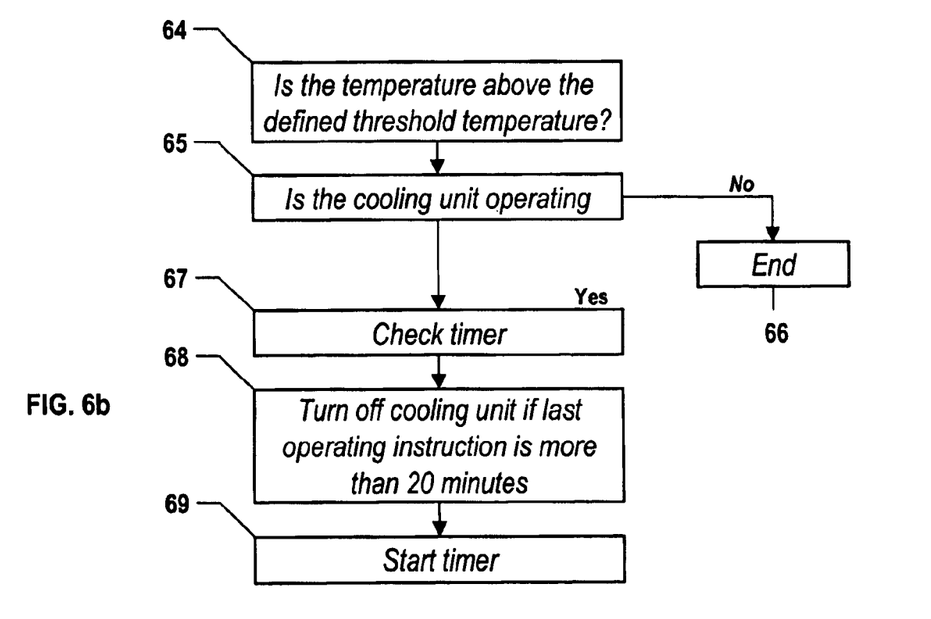

Referring back to workflow manager in FIG. 5, if the temperature reading is the not the first change since initiating the workflow manager, and the reading was a temperature increase and the cooling unit was in an initial status of off, then the workflow manager will activate the workflow illustrated in FIG. 6b in step 58. In FIG. 6b, step 64 determines whether the temperature is above the threshold temperature. If this temperature is not above the threshold temperature, then the routine ends. If is above the threshold temperature, then step 65 determines whether cooling unit is currently operating. If the cooling unit was operating, then the routine ends in step 66. Since the cooling unit is operating, it is not necessary to determine whether to turn on the unit. If the unit was not operating, step 67 will check the timer to determine the status of the unit for the past 20 minutes. If the unit has been in the off status for the past 20 minutes, step 68 will turn on the cooling unit. In step 69, the routine will restart the timer. However, if the last operating interval is within 20 minutes, then the unit has not been off for at least 20 minutes. In this case, the unit will not be activated even though the temperature is above the threshold temperature.

Figure 6C:
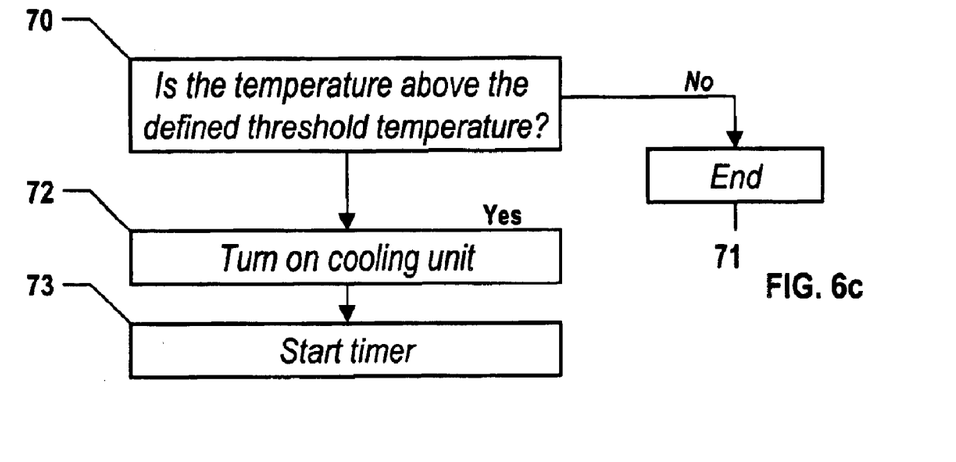
Figure 6D:
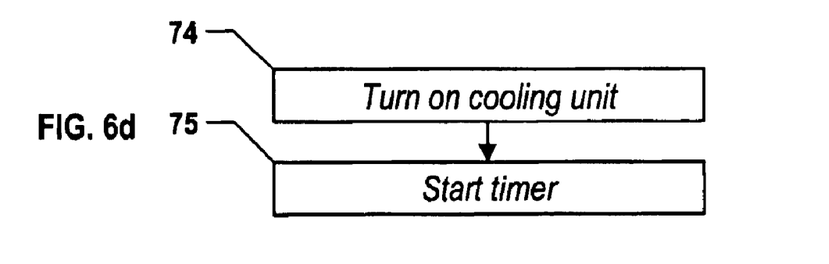
Figure 6E:
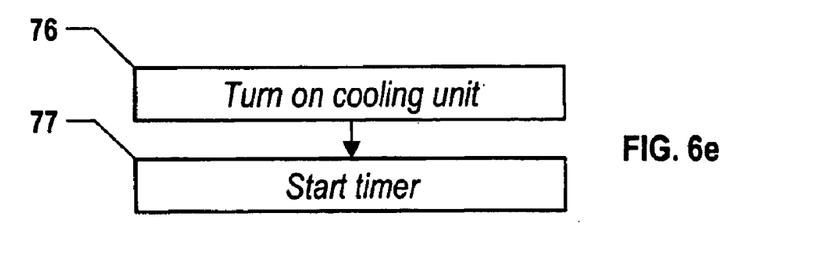

Referring back to FIG. 5, in step 55, when the workflow manger detects a temperature status change as a temperature decrease, the workflow routine in FIG. 6c is activated. Referring to FIG. 6c, step 70 determines whether the new temperature is above the threshold temperature. Step 71 ends the routine if the new temperature is above the threshold temperature. Step 72 turns off the cooling unit if the temperature is below the threshold temperature. After turning off the unit, step 73 restarts the timer. FIG. 6d is a two-step workflow routine. Step 74 is to turn on the cooling unit. Step 75 is and step starting the timer. FIG. 6e is another two-step process with steps 76, which is to turn off the cooling unit and step 77 again sets the timer. In the present example, the workflow manager of the present invention responds to several different conditions involving the status of the cooling unit, the current measured temperature and the immediate past temperature.

Figure 7:
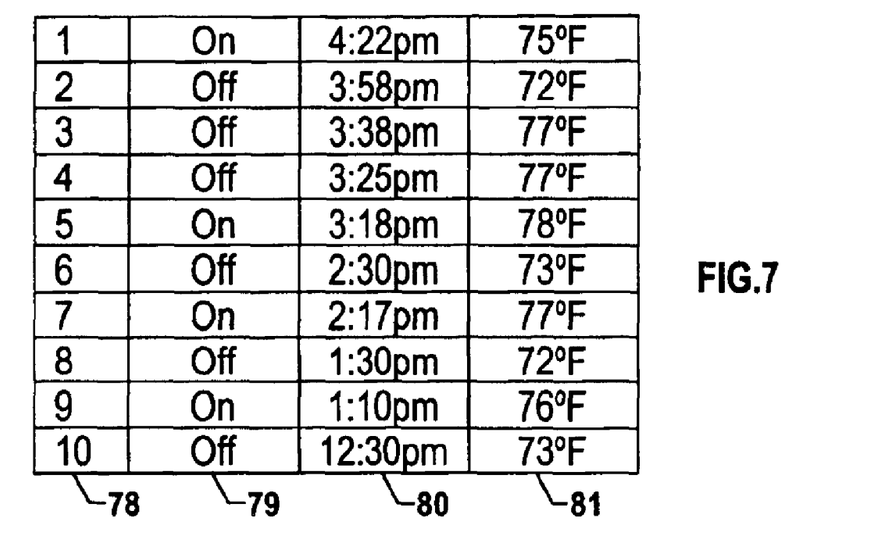
FIG. 7 is an example of a state history for the thermostat shown in FIG. 4.

FIG. 7 shows the stored status history for the cooling unit device of the system in FIG. 4 as a result of the implemented set of workflow routines. The recorded data stored in this format comprises attributes such device state 78, Power 79, Time 80, and Temperature 81. The data shows the different operating decisions for the cooling unit based on the initial requirement of 20-minute intervals. In an example, in FIG. 7, record 5 shows that the cooling unit was turned on at 3:18 p.m. when the temperature reading was 78° F. At 3:35, there was new temperature reading, which constituted a status change and the creation of a new status record 4. In this record, the cooling unit remained on because the temperature was above the threshold temperature of 75° F. and 20 minutes had not elapsed. The check of the temperature in response to this change could have been implemented through the workflow routine in FIG. 6c. At 3:38 p.m., the cooling unit was turned off regardless of the temperature reading because the 20 minutes has elapsed. In other scenarios, the cooling unit may not have been able to come on even though the temperature was above a threshold temperature because the 20-minute operation interval had not elapsed.

Figure 8:
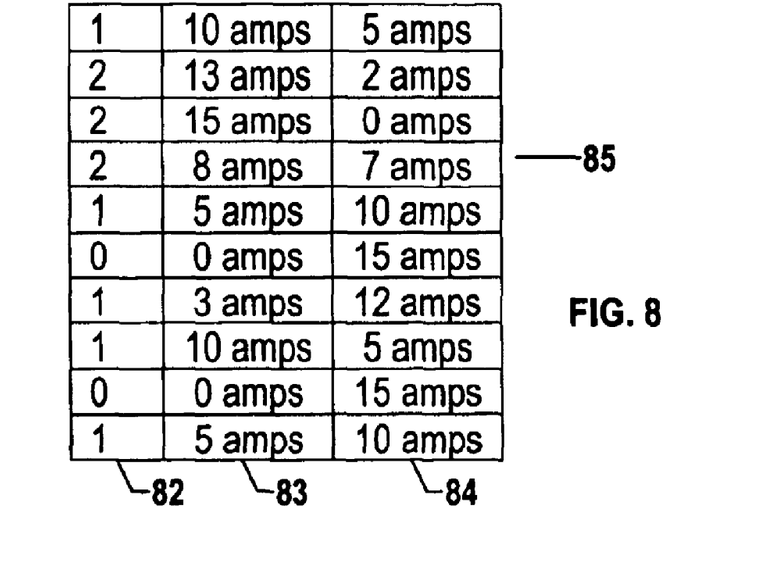
FIG. 8 is an example status history of an electrical outlet device of a network stored in accordance with the method of the present invention.
Figure 9:
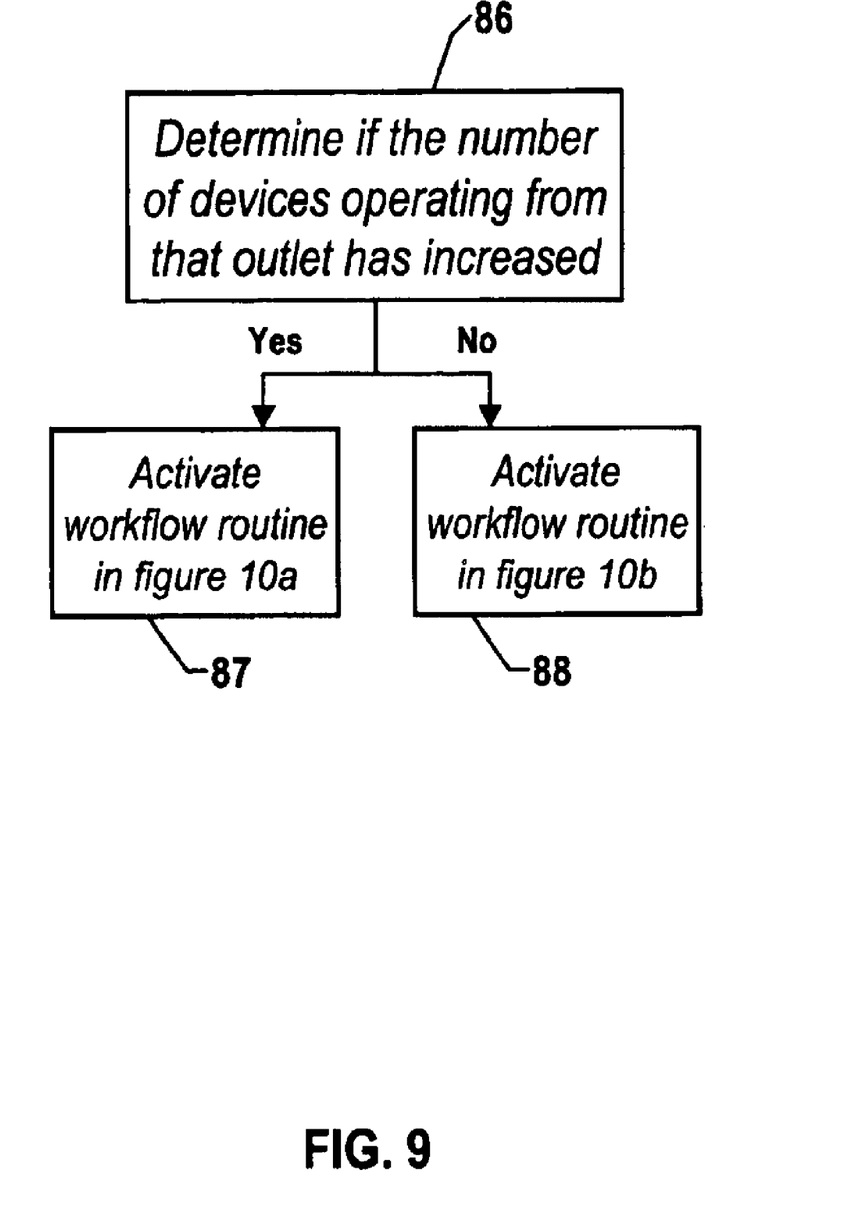
FIG. 9 is flow diagram of a workflow manager that can manage the implementation of the workflow routines in FIGS. 10a and 10b.
Figure 10A:
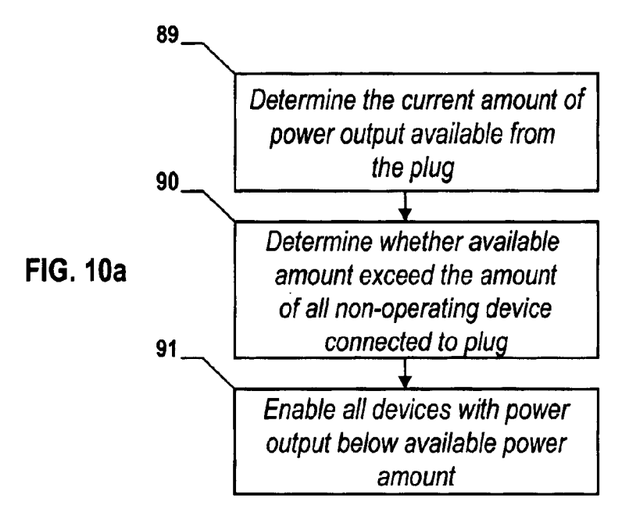
FIG. 10a is a flow diagram of the workflow for an electrical outlet when a device connected to the outlet begins operations.
Figure 10B:
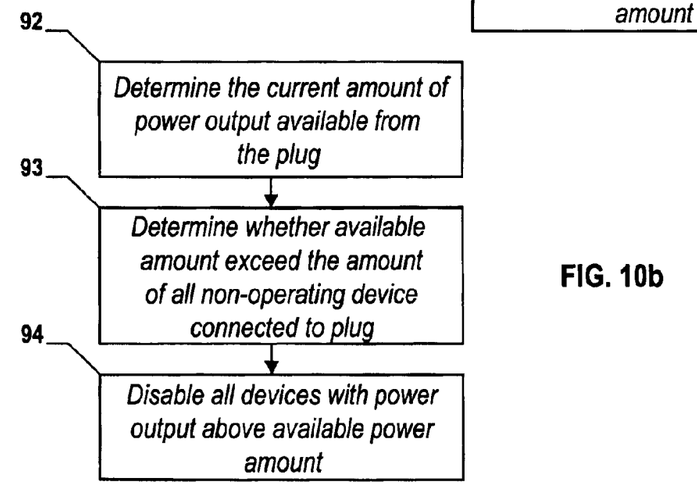
FIG. 10b is a flow diagram of the workflow for an electrical outlet when a device connected to the outlet ceases operations.

Another example of a workflow routine for a device is illustrated in FIGS. 8 through 10. The device in this example is an electrical outlet. The outlet can supply a defined amount of power output. For this discussion, the power output will be 15 amps. FIG. 8 shows a device status history chart. This chart contains columns for the number of connected devices that are currently drawing power from the outlet 82, the current amount of power drawn 83 and the current amount of available power 84. The workflows for this outlet will control the amount of power that can be drawn from this outlet to prevent the possibility of overloading the outlet.

FIG. 9 a flow diagram of the steps in a workflow of the present invention implemented for an electrical outlet device. Referring back to the system described in FIG. 1, all devices that connect to the outlet device will submit to the state manager specific device attributes about the connecting device. In this case, the information will include the type of device and the amount of power required for the device to operate. The maximum power output of the outlet is already known. Also known is the number of devices that are currently connected to that outlet. When the workflow manager detects a change in the number of devices operating from that outlet, step 86 determines if number of devices currently operating from that output increased or decreased. The workflow manager retrieves the number of devices that are currently operating from the stored outlet status information. The workflow manager also retrieves the past number of devices operating from that outlet. From these two numbers, there is a determination whether the number of devices increased or decreased. If the number of devices increased, in step 87 the workflow manager will activate the workflow routine in FIG. 10a. If the number of devices decreased, in step 88 the workflow manager will activate the workflow routine in FIG. 10b.

FIG. 10a illustrates a workflow routine for an electrical outlet when a device connected to the outlet begins operations. When a connected device begins to operate, there will be an increase in the available power at the outlet. This status change will be sent to the storage repository for the outlet device. Step 89 will determine the amount of power now available from the outlet. Step 90 will determine if the amount of available power is greater than the amount of power required by all non-operating devices connected to the outlet. If the available power is greater than the power required by the non-operating devices, then step 91 will keep all non-operating devices enabled to operate.

FIG. 10b is a flow diagram of the workflow for an electrical outlet when a device connected to the outlet ceases operations. When a non-operating device begins to operate, this device will begin to draw power through the outlet device. Step 92 will determine the amount of power now available from the outlet. Step 93 will determine if the amount of available power is greater than the amount of power required by all non-operating devices connected to the outlet. If the amount of available power is not greater than the power required by some of the connected devices, then step 94 will disable the devices that have power requirements that exceed the available power at the outlet device. In an example, a 15-amp outlet device has three devices connected to it. One of the devices requires 10 amps and the other connected devices require five amps and three amps respectively. As shown record 85 of FIG. 8, when the three amp and five amp devices are operating, there are only seven amps of available power. Therefore, the 10-amp device, if it is not operating, will be disabled until one of the devices ceases to operate and draw power. At that time, the 10-amp device will be enabled.

There are many other examples of workflow routines that could be applied to control the operation of any device. The range of workflow routines can be from one attribute of one device to multiple attributes from multiple devices. The combinations of workflow routine designs can be potentially endless. However, the creation of a workflow scenario will have a basis in the device status history information that is gathered for each device.

The methods of the present can apply to scenarios that involve network components in addition to specific devices on the network. The network will contain system resources such as analysis programs, security programs, routines that store information and routines that affect the transmission and conversion of messages. It is possible to have a network configuration in which the status information from these system components can be stored and used to trigger network activities in the same manner that device status can trigger network activities.

It is important to note that while the present invention has been described in the context of a fully functioning data communication system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method for managing the initiation of routines that control device activities on a network wherein the activities are based on device status information, the method comprising the steps of:

defining a condition in which the operations of one or more devices are to be controlled by one or more routines, the defined condition being influenced by the operational history of the one or more devices;

defining a set of one or more routines to implement the operations of one or more devices on the network;

defining a set of one or more devices that will have status data that will impact the defined set of conditions, the status data including the operational history data of a device;

detecting a change in the status of an attribute in at least one of the devices in the defined set of devices; and initiating one or more of the set of routines when a defined condition exists based on the occurrence of the defined condition.

2. The method as described in claim 1 wherein a defined condition comprises the detected change in a device attribute, the current status of one or more device attributes and the operational history of the device.

3. The method as described in claim 1 wherein a defined condition comprises the detected change in a device attribute, a history of the changes in that device attribute and a calculated device attribute based on the current status of one or more device attributes.

4. The method us described in claim 1 wherein the set of conditions is a set of one or more events that cause communication between two or more devices.

5. The method as described in claim 1 wherein said routine initiating step comprises disabling one or more routines when a defined condition exists.

6. The method as described in claim 1 further comprising before said routine initiating step, the step of determining whether the status change of a device attribute and the operational history of the device create a defined condition.

7. The method as described in claim 1 wherein said routine initiating step further comprises the step of determining which set of one or more routines to initiate based on the defined condition that exist when a change in a status of a device attribute is detected.

8. The method as described in claim 1 further comprising before said routine initiating step, the step of calculating device attributes based on a detected change in the status of a defined device and operational history of the device attribute.

9. The method as described in claim 1 further comprising before said routine initiating step, the step of evaluating each condition that contains the device having the detected changed attribute, determining which of the conditions are affected by the changed attribute and activating the routines that are affect by the changed device attribute.

10. The method as described in claim 1 further comprising before said change detecting step, the step of monitoring the defined conditions for changes in device attributes of the defined set of devices.

11. A computer program product in a computer readable medium for managing the initiation of routines that control device activities on a network wherein the activities are based on device status information, the computer program product comprising:

instructions for defining a condition in which the operations of one or more devices are to be controlled by one or more routines, the defined condition being influenced by the operational history of the one or more devices;

instructions for defining a set of one or more routines to implement the operations of one or more devices on the network;

instructions for defining a set of one or more devices that will have status data that will impact the defined set of conditions, the status data including the operational history data of a device;

instructions for detecting a change in the status of an attribute in at least one of the devices in the defined set of devices; and instructions for initiating one or more of the set of routines when a defined condition exists based on the occurrence of the defined condition.

12. The computer program product as described in claim 11 wherein said routine initiating instructions further comprise instructions for disabling one or more routines when a defined condition exists.

13. The computer program product as described in claim 11 further comprising before said routine initiating instructions, instructions for determining whether the status change of a device attribute and the operational history of the device create a defined condition.

14. The computer program product as described in claim 11 wherein said routine initiating instructions further comprise instructions for determining which set of one or more routines to initiate based on the defined condition that exist when a change in a status of a device attribute is detected.

15. The computer program product as described in claim 11 further comprising before said routine initiating instructions, instructions for calculating device attributes based on a detected change in the status of a defined device and operational history of the device attribute.

16. The computer program product as described in claim 11 further comprising before said routine initiating instructions, the instructions for evaluating each condition that contains the device having the detected changed attribute and determining which of the conditions an affected by the changed attribute and activating the routines that are affect by the changed device attribute.

17. The computer program product as described in claim 11 further comprising before said change detecting instructions, the instructions for monitoring the defined conditions for changes in device attributes of the defined set of devices.

18. A method for managing the initiation of routines that control operational activities on a network wherein the activities are based on network status information, the method comprising the steps of:

defining a condition in which the operations of one or more network components are to be controlled by one or more routines, the defined condition including the operational history of the one or more network components;

defining a set of one or more routines to implement the operations of one or more network components on the network;

defining a set of one or more network components that will have status data that will impact the defined condition, the status data including operational history of the network components;

detecting a change in the status of an attribute in at least one of the network components in the defined set of network components; and initiating one or more of the set of routines when a defined condition exists based on the occurrence of the defined condition.

19. The method as described in claim 18 wherein a defined condition comprises the detected change in a network component attribute, the current status of one or more network component attributes and the operational history of the network component attribute.

20. The method as described in claim 18 wherein a defined condition comprises the detected change in a network component attribute, a history of the changes in the device attributes and a calculated network component attribute based on the current status of one or more network component attributes.

21. The method as described in claim 18 wherein the set of conditions is a set of one or more events that cause communication between two or more network components.

22. The method as described in claim 18 wherein said routine initiating step comprises disabling one or more routines when a defined condition exists.

23. The method as described in claim 18 further comprising before said routine initiating step, the step of determining whether the status change of a network component attribute and the operational history of the network component attribute a defined condition.

24. The method as described in claim 18 wherein said routine initiating step further comprises the step of determining which set of one or more routines to initiate based on the defined condition that exist when a change in a status of a network component attribute is detected.

25. The method as described in claim 18 further comprising before said routine initiating step, the step of calculating network component attributes based on a detected change in the status of a defined network component and the operational history of the network component attribute.

26. The method as described in claim 18 further comprising before said routine initiating step, the step of evaluating each condition that contains the network component having the detected changed attribute, determining which of the conditions are affected by the changed attribute and activating the routines that are affect by the changed network component attribute.

27. The method as described in claim 18 further comprising before said change detecting step, the step of monitoring the defined conditions for changes in network component attributes of the defined set of network components.

* * * * *